Feb. 17, 1948.  E. J. NEWCOMER  2,436,223
PRODUCT VENDING MACHINE
Filed June 19, 1946  5 Sheets-Sheet 1
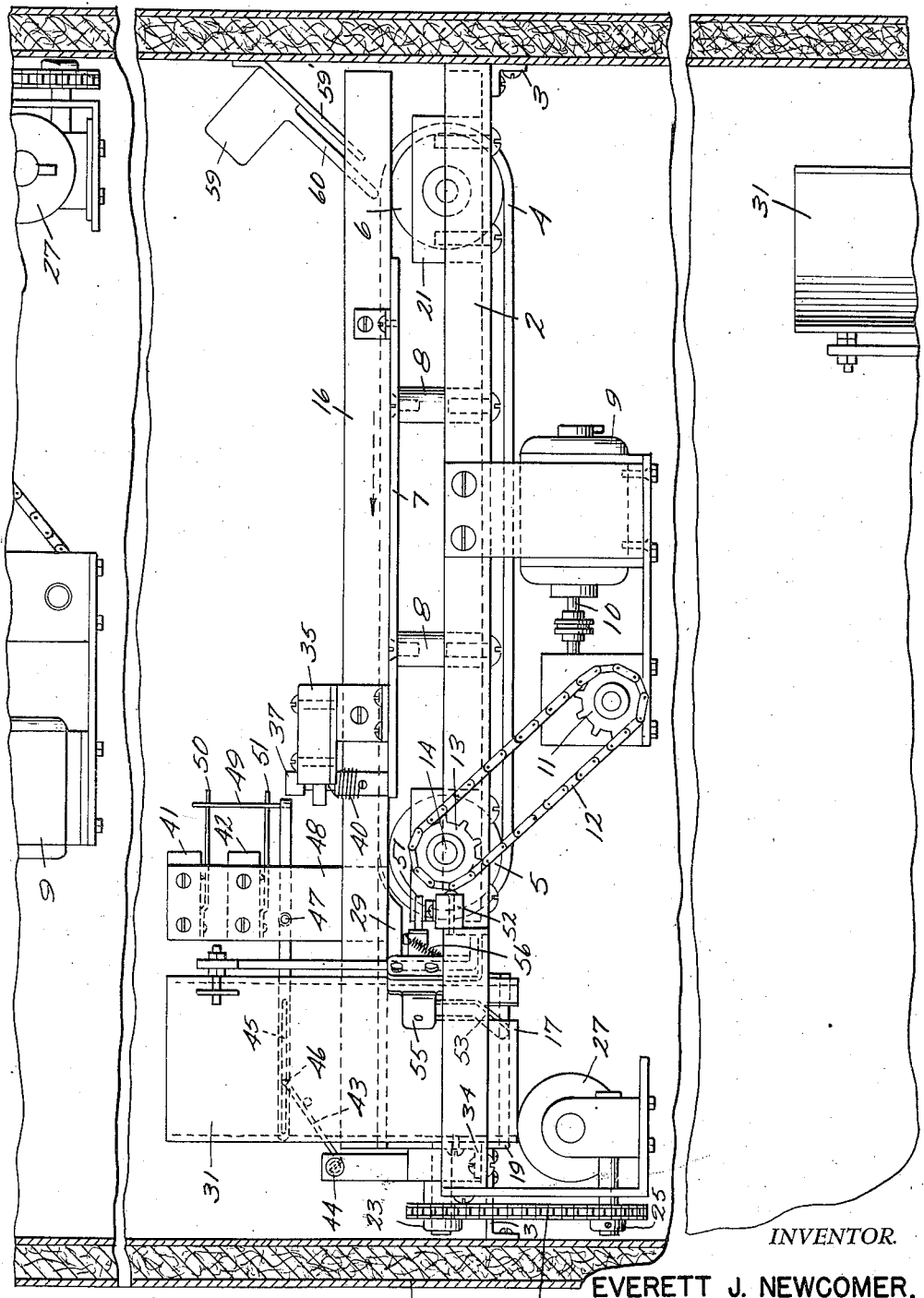
FIG. I.
INVENTOR.
EVERETT J. NEWCOMER,
BY *Victor J. Evans & Co.*
ATTORNEYS

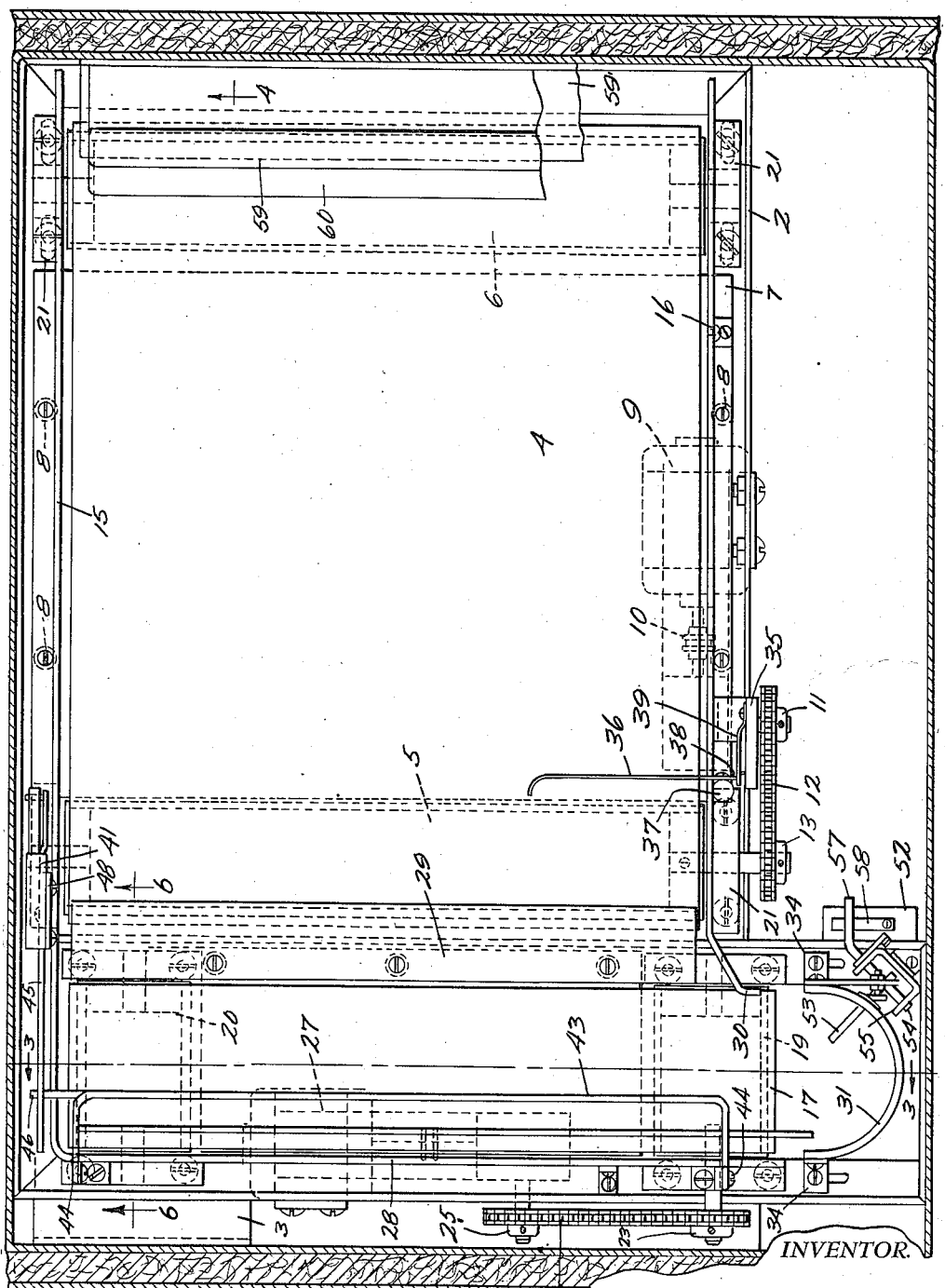

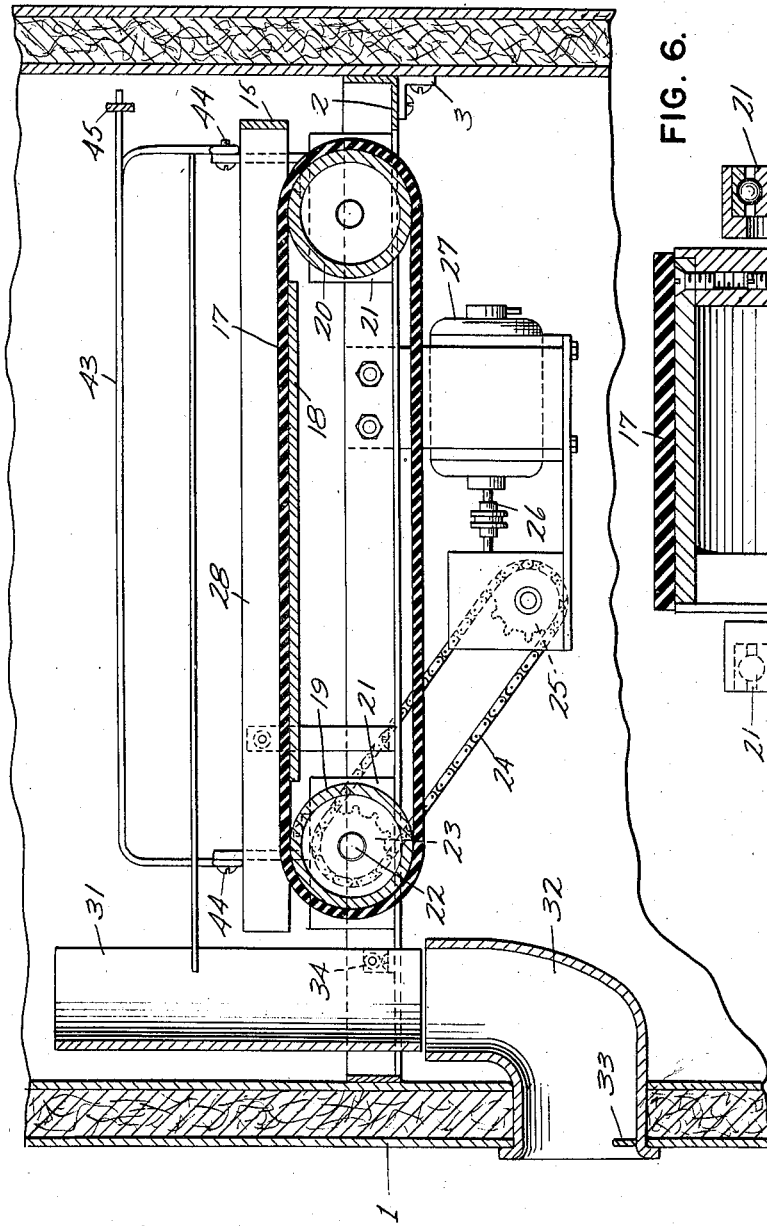
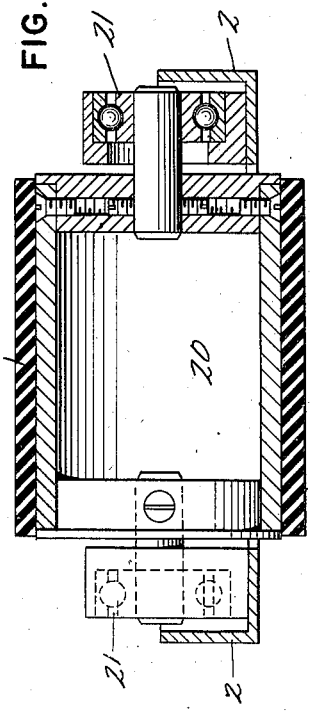

Feb. 17, 1948.    E. J. NEWCOMER    2,436,223
PRODUCT VENDING MACHINE
Filed June 19, 1946    5 Sheets-Sheet 4

INVENTOR.
EVERETT J. NEWCOMER,
BY *Victor J. Evans & Co.*
ATTORNEYS

Feb. 17, 1948.  E. J. NEWCOMER  2,436,223
PRODUCT VENDING MACHINE
Filed June 19, 1946    5 Sheets-Sheet 5
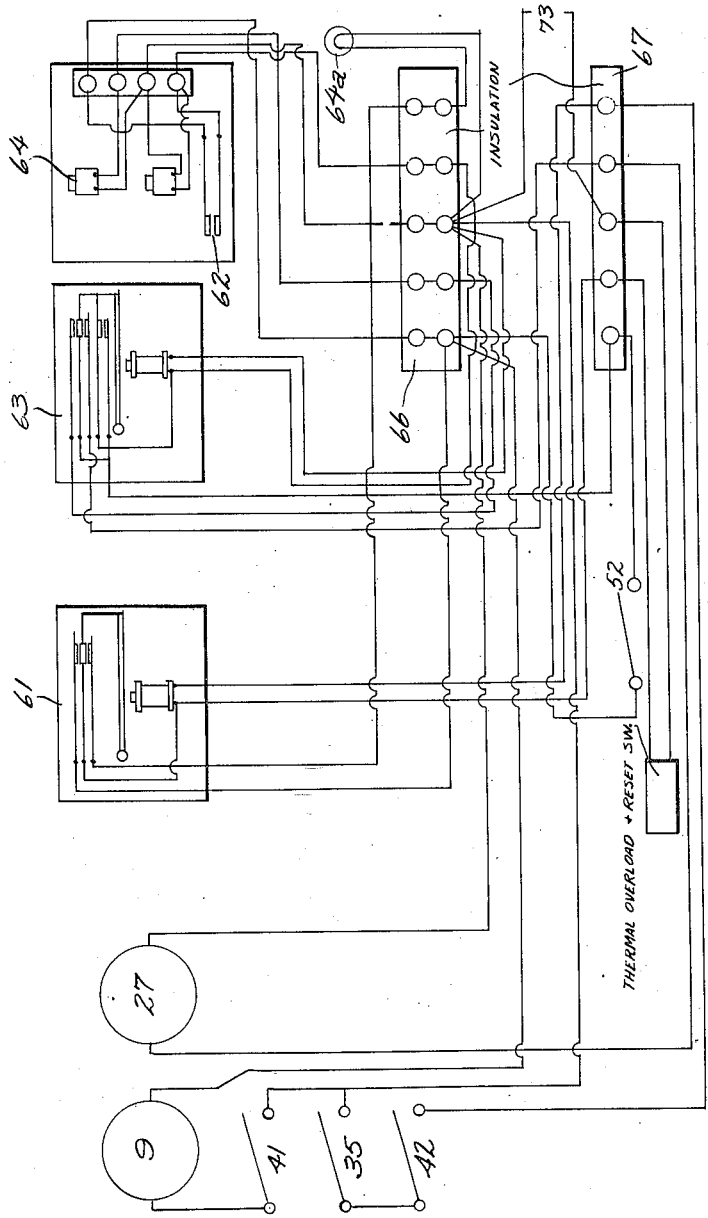
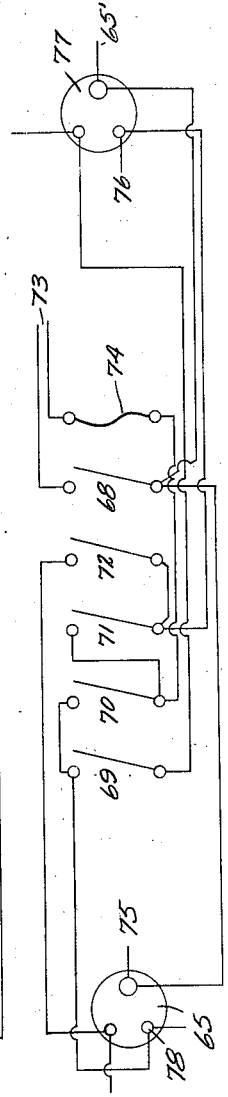
FIG. 7.
FIG. 8.
INVENTOR.
EVERETT J. NEWCOMER,
BY *Victor J. Evans & Co.*
ATTORNEYS Patented Feb. 17, 1948

2,436,223

UNITED STATES PATENT OFFICE 2,436,223

PRODUCT VENDING MACHINE

Everett J. Newcomer, Kew Gardens, N. Y., assignor to City Vending Equipment Corp., Maspeth, Long Island, N. Y., a corporation of New York Application June 19, 1946, Serial No. 677,891

3 Claims. (Cl. 312—36)

1

My present invention relates to improvements in vending machines of the coin operated and electrically controlled type, and designed for dispensing or vending packaged commodities, such as milk, which is hereinafter referred to as a product being dispensed in a container.

The primary object of the invention is the provision of a compactly arranged, coin-controlled vending mechanism that is simple in construction and operation, and reliable for controlling the feeding, delivery, and discharge of a container to a customer.

In carrying out my invention a horizontally disposed storage and feeding conveyer, is combined with a delivery and discharge conveyer moving in a direction perpendicular to the direction of travel of the feeding conveyer, and the vended container is discharged by gravity to the purchaser.

The invention consists in certain novel combinations and arrangements of these parts as will hereinafter be more fully described and claimed.

In the accompanying drawings I have illustrated one complete example of the physical embodiment of my invention wherein the parts are combined and arranged in accord with one mode I have thus far devised for the practical application of the principles of my invention. It will be understood that changes and alterations may be made in these mechanical and electrical structures exemplified in the drawings without departing from the principles of the invention.

Figure 1 is a vertical front view showing the mechanical parts of a unit of the vending machine in which my invention is embodied, together with portions of the lateral walls of a cabinet in section, and also indicating portions of two other adjacent units of the cabinet.

Figure 2 is a plan view of the machine in Fig. 1.

Figure 3 is a vertical sectional view on the line 3—3 of Figure 2 showing the delivery conveyer and discharge chute, and accessories.

Figure 6 is a detail sectional view at line 6—6 of Fig. 2 showing the delivery conveyer, one of its rollers, and journal bearings therefor.

Figure 7 is an electrical diagram of the wiring and appliances for the operation and control of one unit of the vending machine; and Figure 8

Figure 4:
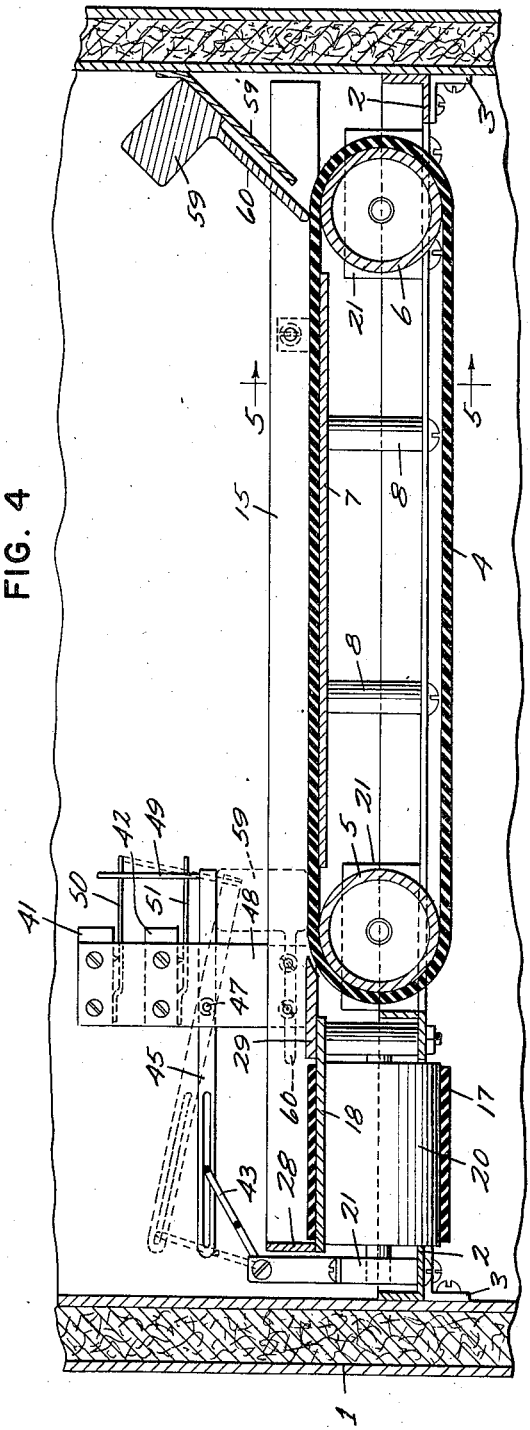
Figure 4 is a vertical sectional view at line 4—4 of Fig. 2 showing the feeding conveyer in longitudinal section and the delivery conveyer in transverse section.
Figure 5:
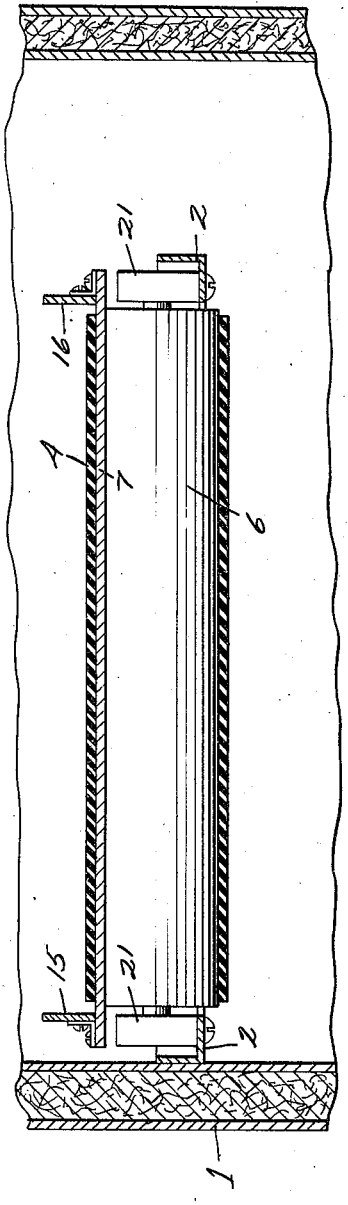
Figure 5 is a transverse vertical sectional view at line 5—5 of Fig. 4 showing the storage and feeding conveyer and one of its rollers.

2 is an electrical diagram of the wiring for multiple units when employed in the vending machine.

In the drawings the operating parts of the vending machine are enclosed within a cabinet 1 of suitable size and shape, which may be fashioned with a double wall construction, and insulated for refrigerating purposes when perishable goods are to be vended. Multiple vending units may be enclosed within the same cabinet, but at different levels, for vending either the same product, or different products, prepared in packages or containers. For purposes of illustration and description, one such unit is herein disclosed, and the product to be vended is referred to as milk contained in a bottle or other container.

The interior operating units at each level within the cabinet are supported upon a rectangular, horizontally disposed main frame 2 that is supported in suitable brackets 3 from the walls of the cabinet.

For storing and feeding the containers they are first deposited in alined rows upon the upper or conveyer flight of an endless feed belt 4 of rubber, or other suitable flexible material, which belt is mounted to travel over a drive roller 5 and a spaced driven roller 6, both of which are journaled in bearings 21 supported in suitable manner from the main frame 2.

The conveyer flight of the belt upon which the containers are arranged in right angle rows is intermittently moved to the left in Fig. 4, and guided over a fixed horizontal supporting plate 7 mounted upon a frame 8 in suitable manner to insure a level and substantial support for the containers.

Power for driving the roller 5 is furnished by an electric motor 9 which is supported upon a bracket that depends rigidly from the main frame 2, and power is transmitted to the drive roller from motor shaft 10 through a sprocket wheel 11, chain 12, and the driven sprocket wheel 13 of the drive shaft 14 of the roller.

The conveyer flight of the feed belt travels from right to left in Figs. 1 and 4, and a vertically arranged, lateral, guide plate 15 is mounted on the frame 8 at the rear edge of the belt; a similar guide plate 16 being mounted parallel with the front edge of the conveyer flight, to confine the load or supply of containers, and to prevent their displacement.

The feed belt with its load of containers, is intermittently moved or mechanically operated under automatically activated electrical control means for the motor 9, as will be described.

From the feed belt the containers are fed in successive quantities or rows to a delivery belt 17 of a type similar to the feed belt, and the conveyer flight of the delivery belt is also intermittently moved, in a direction perpendicular to the movement of the feed belt, so that the conveyer flight of the delivery belt may deliver a single container from the front end of a single row being conveyed by the delivery belt.

This comparatively narrow single row delivery belt 17 with its conveyer flight supported on and sliding over a fixed plate 18 forming part of the main frame 8, is mounted upon a drive roller 19 and a driven roller 20, both of which are journaled in ball bearings 21 supported upon parts of the main frame 2. Power is supplied to the shaft 22 of the drive roller 19 through a chain drive including a driving sprocket wheel 23, chain 24, and sprocket 25 operatively connected with the drive shaft 26 of an electric motor 27, and the motor is supported in a bracket frame depending from the main frame of the unit.

The delivery belt is of a width to accommodate a single row of containers, and a lateral guide plate 28, supported from the main frame holds the row of containers in alinement from front to rear ends of the delivery belt.

As best seen in Fig. 1, the upper conveyer flight of the feed belt is slightly elevated above the adjoining edge of the delivery belt, and between the two belts is interposed an intermediate rest plate or transfer plate 29 arranged parallel to and with its conveyer surface flush with the conveyer flight of the feed belt.

This transfer plate, which extends the full width of the feed belt, and also extends the full length of the delivery belt, is rigidly mounted on the main frame of the machine, and its front end terminates at an angular guide wall 30 fashioned at the left end of the lateral guide 16 for the feed belt.

The delivery belt is also intermittently operated under mechanism that is automatically actuated to activate electrical controls for the power supplying motor 27, to feed the front container from its single row of containers, in upright position against a vertically disposed, semicircular baffle wall 31, or delivery chute, that is mounted on the main frame at the front interior portion of the cabinet, or enclosure 1.

The delivery chute is mounted in the path of the forwardly moving row of containers, and it is adapted to receive a single container in upright position, and drop the container under gravity feed into a discharge receptacle 32, of elbow shape, and having a stop 33 for the container.

The discharge receptacle is mounted in the front wall of the cabinet, and it is provided with an open front for ready access of the purchaser of the container which comes to rest against the stop 33.

For convenience in adjustment, the chute 31 is mounted by brackets 34 and slot connections, in order that it may correctly be located in position to receive the single container that is deposited therein from the delivery belt.

To prevent the machine from being operated in an empty condition when both the feed and delivery belts are empty, an empty-feed switch 35, which is mounted upon a frame at one side of the belt, is mechanically operated by movement of a lever arm 36 extending transversely over the feed belt. This lever arm is pivoted at 37 with its inner pivot end 38 in position to contact with a complementary spring blade 39 forming the stationary contact of the switch, and a coil spring 40 tends to retract the lever in the absence of contact with the containers.

The operation of the motor 9, and the consequent movement of the feed belt 4 is automatically controlled by switch 41 mounted at the rear end of the belt 17.

The delivery empty switch 42 is mounted below the switch 41 and is operated simultaneously with switch 41. These switches are initially controlled by means of a replacement bar or yoke 43, which extends longitudinally of the delivery belt 17 and over the center of the delivery belt, and with its inturned ends pivoted at 44, upon the main frame and at one side of the delivery belt.

The pivoted yoke 43 is held in uplifted position by contact with the sides of the containers in the delivery row on the belt, and in this position, the operating switch 41 opens the motor operating circuit.

In the absence of containers on the delivery belt, the unsupported yoke swings down upon its pivots as a center, thereby operating a switch lever 45 which has a sliding pin and slot connection 46 with the rear end of the yoke.

The horizontally disposed switch lever 45 is pivoted at 47 on an upright supporting bracket 48, and the lever is equipped with an upright or angular operating arm 49 which co-acts with the two movable contacts 50 and 51, respectively, of the switches 41 and 42.

A delivery cut-off switch 52, which is normally closed, is mounted at the lower end of the discharge chute for controlling the delivery circuit in connection with the motor 27.

This cut-off switch is activated by a vended container as it passes down through the discharge chute 31, and for this purpose a depressible operating arm 53 is located within the chute in the path of the discharging container. The arm is fixed to a rock-shaft 54 journalled in bracket 55, and a spring 56 resiliently holds the depressible arm in the path of the discharging container. One end of the rock shaft terminates in an angular movable contact arm 57 that swings down into frictional engagement with a stationary contact blade 58 for closing the cut off switch 52.

In loading the containers in the cabinet, they are initially alined on the delivery belt with the replacement yoke 43 in uplifted position with the delivery-empty switch 42 and the feeding switch 41 open, and the respective motors 27 and 9 idle.

Lever arm 36 is turned ninety degrees counterclockwise from the position in Figure 2 and containers are then stored in rows upon the conveyor flight of the feed belt, in position to retain the spring pressed lever arm parallel with the direction of travel of the feed belt, and the storage-empty switch 35 is in open circuit.

When a coin is inserted in the coin actuated mechanism (not shown), electrical connections are thereby closed through relay 63 to energize the delivery motor 27, causing movement of the delivery belt 17 with its row of containers toward the front baffle and chute 31. As the first or leading container is delivered by the delivery belt, it falls by gravity against the discharge baffle 31, and thence is deposited in the receptacle 32.

By passing contact with the cut off arm 53, the container opens the cut-off switch 52, thereby cutting out all electrical current otherwise flowing to the machine, and placing the machine in condition for the insertion of another coin and a succeeding vending operation, which operations are repeated as long as any containers remain upon the delivery belt.

As the last container in the delivery row is vended, the unsupported replacement yoke 43 swings down and causes closing movement of the feed switch 41 for operating the motor 9, whereupon the conveyer flight of the feeding belt is moved toward the delivery belt, thus forcing a row of containers from the feed belt to the transfer plate 29 and thence to the delivery belt. In this movement the front row of containers presses against the replacement yoke, forcing it into an upward position, thereby breaking the circuits to both the feed switch 41 and the delivery empty switch 42.

The last row of containers on the feed belt may be transferred to the delivery belt by means of a weight 59 movably supported by an inclined ramp 59' secured to the cabinet 1, and adapted to extend transversely across the rear end of the feed belt, and having a forwardly projecting extension 60 equaling the width of the transfer plate 29 contacting the last row of containers. As the last row of containers travels forwardly with the storage feed belt, the weight 59, by gravity, moves into position on the feed belt, and will remain in engagement with the last row on the feed belt, to force the last row of containers over the rest plate 29 onto the delivery belt.

When the last row of containers has been forced from the feed belt to the delivery belt, thus releasing the empty-arm 36, torsion spring 40 swings the arm back into position of Figure 2, thus closing its operating circuit.

When the last container is discharged from the delivery chute from the delivery belt, the replacement yoke 43 swings down thereby closing the switch 42 as previously described.

In the electrical diagram, storage empty switch 35 and delivery empty switch 42 are closed in series when the machine is empty of containers, and both of these switches are connected to a relay 61 for its activation, and the opening and closing of the switch 42 is controlled by the movement of the replacement bar or yoke 43.

Referring to the electrical diagram of Figure 7, upon the insertion of a coin into the coin operated mechanism, electrical contact is made at 62 in series with one of the main electric lines, and with the main operating relay 63, thus closing the operating circuit and energizing the delivery motor 27 to initiate a vending operation. Under these conditions, a coin blocking magnet 64 is de-energized to permit automatic closing of a barrier or finger (not shown) that closes the entrance to the coin chute.

During delivery and discharge of the vended container, the delivery cut-off switch 52 breaks the circuit of the main operating relay 63, delivery motor 27 is de-energized, and the coin blocking magnet is automatically re-energized by this action, and coin barrier or finger is retracted from the coin chute, thus re-setting the coin operated mechanism for another vending operation.

An empty condition of the machine is indicated to a customer by means of an electric lamp 64A, which is visible when illumined, and including in a lighting circuit under control of the empty-relay 61, at which time all current ceases to flow within the machine, except current in the electro-magnetic empty relay coil and the light circuit.

The above described mechanical and electrical features apply to a single unit of the vending machine; when multiple units are employed in the same vending machine and operated singly, a change-over electrical equipment is utilized, to successively control the operations of the multiple units, as well as for simultaneously controlling two operating units.

This changeover equipment is under control of manually operated switches 68, 69, 70, 71 and 72 and a three prong polarized plug and socket connection at 65 and 65' in Figure 8 which connects with main line and empty relay terminals on the terminal boards 66 and 67 of the upper and lower level units.

One electrical contact is established to both the upper and the lower levels through sockets 65 and 65' by closing manually operated switch 68 of the changeover circuit, and the second electrical contact to the upper level circuit will be energized through relay 61 by the opening of the storage empty switch 35 and the delivery empty switch 42 when the top level is loaded with products. This will completely energize the upper level and leave the lower level with only one electrical contact closed, that through switch 68 of the changeover circuit.

When storage empty switch of upper level 35 and delivery empty switch 42 are in closed position by reason of upper level having been emptied of its products, the second electrical contact to lower level will be energized through relay 61 and socket 65'.

With the upper level energized for vending first, manual switches 69, 70, 71 and 72 will be in an upward position with switch 69 open, switch 70 closed, switch 71 open and switch 72 closed. With the switches 69, 70, 71 and 72 in a downward position, exactly the reverse of the above cycle takes place, i. e., the lower level will operate first and when this level is empty, the upper level will become operative. If it be desired to operate both the upper level unit and the lower level unit simultaneously, switch 69 will be opened and switch 70 will be closed, and switch 71 will be closed and switch 72 open, thus connecting the main line 73 directly to the closed terminals 78 and 75 of the upper level 65 and connecting terminals 76 and 77 to the lower level 65'.

It will be noted that the main electric lines 73 enter the operating circuits through a fuse 74, and the main manually operated switch 68, the latter being provided to break the main electric line to the machine when necessary, as for repairs.

As previously indicated, various changes may be made in the mechanical structures and operating devices, as well as in the electrical arrangements herein disclosed, within the scope of my appended claims.

Having thus fully described my invention, what I claim as new and desire to secure by Letters Patent, is:

1. In a vending machine as described, the combination with a storage feed belt and its containers, a delivery belt and its containers, a motor for driving the storage feed belt, and an operating circuit for the motor including a control switch, of a pivotally mounted replacement yoke co-acting with the containers on the delivery belt for opening the control switch, and automatic means operative in the absence of contact of the containers from said yoke for closing the control switch.

2. In a vending machine as described, the combination with a storage-feed endless belt and a delivery belt and its containers, a supporting plate for the conveyor flight of the storage feed belt, a drive roller and a driven roller for said belt, of an electric motor and a sprocket-chain drive between the motor and the drive roller, an operating circuit for the motor and a control switch therein, a pivotally mounted yoke co-acting with containers on the delivery belt for rendering inoperative the motor, and automatic means co-acting with the yoke for rendering the motor operative in the absence of contact of the containers with the yoke.

3. In an article dispensing device comprising in combination a cabinet, a main frame supported therein, a storage and feeding conveyor rotatably supported by said main frame and adapted to contain a plurality of aligned rows of articles, a first power means for driving said storage and feeding conveyor, a delivery conveyor rotatably supported by said main frame adjacent said storage and feeding conveyor for movement at right angles thereto, a second power means for driving said delivery conveyor, a transfer plate attached to said main frame and extending between said conveyors, yoke means extending longitudinally and parallely above said delivery conveyor, a first switch means for controlling the energization of said first power means, a switch lever means connected to said yoke means and said first switch means whereby the absence of an article on said delivery conveyor will free said yoke for downward movement to actuate said first switch means thereby energizing said first power means for advancing said storage and feeding conveyor whereby movement of said storage and feeding conveyor will deposit intermittently and successively an aligned row of articles on said delivery conveyor, a coin actuated mechanism for initiating operation of said delivery conveyor by energizing said second power means, a discharge chute adjacent the end of said delivery conveyor for receiving an article for dispensing the same by gravity from the chamber and a switch means in said chute and connected to said second power means, said switch means extending into the path of the discharged article for actuation thereby to interrupt actuation of said second power means whereby said delivery conveyor will dispense said row of articles singly.

EVERETT J. NEWCOMER.

REFERENCES CITED

The following references are of record in the file of this patent:

UNITED STATES PATENTS

| Number | Name | Date |
|---|---|---|
| 1,200,244 | Sears | Oct. 3, 1916 |
| 1,355,488 | McKenney | Oct. 12, 1920 |